United States Patent
Lee et al.

(10) Patent No.: US 11,567,600 B2
(45) Date of Patent: Jan. 31, 2023

(54) TOUCH DISPLAY DEVICE AND METHOD OF DRIVING THE SAME

(71) Applicant: LG Display Co., Ltd., Seoul (KR)

(72) Inventors: Byoung Gwan Lee, Paju-si (KR); Sung Yub Lee, Seoul (KR); Su Yun Ju, Gimpo-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/544,628

(22) Filed: Dec. 7, 2021

(65) Prior Publication Data

US 2022/0179514 A1 Jun. 9, 2022

(30) Foreign Application Priority Data

Dec. 8, 2020 (KR) .................. 10-2020-0170657

(51) Int. Cl.
*G06F 3/041* (2006.01)

(52) U.S. Cl.
CPC ........ *G06F 3/0412* (2013.01); *G06F 3/04162* (2019.05); *G06F 3/04166* (2019.05); *G06F 3/04184* (2019.05)

(58) Field of Classification Search
CPC ............. G06F 3/04166; G06F 3/04184; G06F 3/0412; G06F 3/03545
See application file for complete search history.

(56) References Cited

U.S. PATENT DOCUMENTS

| 10,444,882 | B2 | 10/2019 | Jung |
| 10,678,368 | B2 | 6/2020 | Gwon et al. |
| 10,739,909 | B1* | 8/2020 | Lin ........................ G09G 5/003 |
| 10,768,719 | B2 | 9/2020 | Ju et al. |
| 10,908,719 | B2 | 2/2021 | Jun et al. |
| 10,936,101 | B2 | 3/2021 | Lee et al. |
| 2017/0031465 | A1* | 2/2017 | Jung ................... G06F 3/03545 |
| 2019/0004664 | A1* | 1/2019 | Zyskind ............. G06F 3/03545 |
| 2019/0113987 | A1* | 4/2019 | Peretz ................. G06F 3/03545 |

FOREIGN PATENT DOCUMENTS

| KR | 10-2018-0025475 A | 3/2018 |
| KR | 10-2018-0062582 A | 6/2018 |
| KR | 10-2019-0081532 A | 7/2019 |
| KR | 10-2019-0081539 A | 7/2019 |
| KR | 10-2020-0001889 A | 1/2020 |

* cited by examiner

Primary Examiner — Robin J Mishler
(74) Attorney, Agent, or Firm — Seed IP Law Group LLP

(57) ABSTRACT

A touch display device is provided. The touch display device includes a display panel configured to display an image, a touch sensor on the display panel, and a touch circuit unit configured to drive and control the touch sensor. The touch circuit unit includes a pen signal correction unit configured to correct a sensing timing of an active pen placed on the touch sensor.

18 Claims, 15 Drawing Sheets

FIG. 20

\<Sensing Delay LUT\>

| Normal Data – Sensing Data | Needed Delay (µs) |
|---|---|
| < 10 | 0 |
| 10 ≤  < 100 | 0.5 |
| 100 ≤  < 200 | 1 |
| ...... | ...... |
| 700 ≤  < 800 | 2.5 |

FIG. 21

\< LUT for Peak Data Comparison\>

| Neighboring/Peak Data Ratio | Normal Peak |
|---|---|
| < 10% | 1600 |
| < 20% | 1300 |
| ...... | ...... |
| < 90% | 800 |

<Example of Neighboring/Peak Data Ratios>

| 82 | 128 | 80 |
|---|---|---|
| 223 | 392 | 186 |
| 99 | 133 | 81 |

| 21% | 33% | 20% |
|---|---|---|
| 57% | 100% | 47% |
| 25% | 34% | 21% |

# TOUCH DISPLAY DEVICE AND METHOD OF DRIVING THE SAME

This application claims the benefit of Korean Patent Application No. 10-2020-0170657, filed on Dec. 8, 2020, which is hereby incorporated by reference as if fully set forth herein.

BACKGROUND

Technical Field

The present disclosure relates to a touch display device and a method of driving the same.

Description of the Related Art

The development of information technology has brought the growth of the market for display devices, which are a connection medium between users and information. Accordingly, display devices such as a light emitting display (LED) device, a quantum dot display (QDD) device, and a liquid crystal display (LCD) device are increasingly used.

Such a display device includes a display panel including sub-pixels, a driver that outputs a driving signal for driving the display panel, and a power supply that generates power to be supplied to the display panel or the driver.

In the display device, upon application of a driving signal, for example, a scan signal and a data signal to sub-pixels on the display panel, the selected sub-pixels transmit light or directly emit light, thereby displaying an image. Further, the display device may receive a touch input from a user based on a touch sensor and execute a command corresponding to the touch input.

BRIEF SUMMARY

One or more embodiments of the present disclosure is directed to a touch display device and a method of driving the same that substantially obviate one or more problems due to limitations and disadvantages of the related art.

The present disclosure is intended to increase the sensing sensitivity of an active pen (for example, improve the sensing ability of the active pen) by reducing or eliminating a signal deviation that may be caused between a touch sensor (touch panel) and the active pen in a device which becomes larger, while overcoming signal reduction at each position of the active pen during downlink sensing of the active pen.

Additional advantages and features of the disclosure will be set forth in part in the description which follows and in part will become apparent to those having ordinary skill in the art upon examination of the following or may be learned from practice of the disclosure. Other advantages of the disclosure may be realized and attained by the structure particularly pointed out in the written description and claims hereof as well as the appended drawings.

To achieve these and other advantages and in accordance with one or more embodiments of the disclosure, as embodied and broadly described herein, a touch display device includes a display panel configured to display an image, a touch sensor on the display panel, and a touch circuit unit configured to drive and control the touch sensor. The touch circuit unit includes an input signal correction circuit configured to correct a sensing timing of an input (e.g., active pen, finger, or the like) placed on the touch sensor. A pen signal correction unit is one embodiment of the input signal correction circuit.

The pen signal correction unit may change the sensing timing according to a position of the active pen.

For each position of the active pen, the pen signal correction unit may change a timing of sensing a pulse generated from the active pen in consideration of a resistance-capacitance (RC) delay based on the position of the active pen.

The pen signal correction unit may change a sensing timing of a downlink sensing signal for sensing a pulse generated from the active pen, based on a phase delay value different for each position of the active pen.

The phase delay value may gradually increase from an area near to an input terminal of the touch sensor toward an area far from the input terminal of the touch sensor.

The pen signal correction unit may define an area nearest to an input terminal of the touch sensor, an area farthest from the input terminal of the touch sensor, and a middle area between the nearest area and the farthest area. When the active pen is located between the middle area and the farthest area, the pen signal correction unit may correct the sensing timing of the active pen based on a phase delay value which gradually increases toward the farthest area, to change a timing of sensing a pulse generated from the active pen.

The pen signal correction unit may define an area nearest to an input terminal of the touch sensor, an area farthest from the input terminal of the touch sensor, and a middle area between the nearest area and the farthest area. When the active pen is located between the nearest area and the farthest area, the pen signal correction unit may correct the sensing timing of the active pen based on a phase delay value which gradually increases toward the farthest area, to change a timing of sensing a pulse generated from the active pen.

The pen signal correction unit may include a lookup table listing data from which a delay time for a sensing delay is derived based on the difference between normal data and sensing data. The normal data may be data obtained from an area with no RC delay or an area with a minimum RC delay, and the sensing data may be data obtained based on driving of the active pen.

The sensing data may be calculated based on a peak data ratio of the active pen, the peak data ratio being used to identify a line or a point in which the active pen is located.

According to another aspect of the present disclosure, a method of driving a touch display device including a display panel displaying an image, a touch sensor on the display panel, and a touch circuit unit configured to drive and control the touch sensor includes generating an uplink signal to be transmitted to an active pen placed on the touch sensor, and sensing a downlink pulse generated from the active pen by changing a sensing timing according to a position of the active pen.

The sensing of a downlink pulse may include changing a timing of sensing the downlink pulse generated from the active pen based on a phase delay value different for each position of the active pen.

The phase delay value may gradually increase from an area near to an input terminal of the touch sensor toward an area far from the input terminal of the touch sensor.

It is to be understood that both the foregoing general description and the following detailed description of the present disclosure are and explanatory and are intended to provide further explanation of the disclosure as claimed.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 20, 21 and 22 are diagrams referred to for describing considerations related to implementation of a touch display device according to an embodiment of the present disclosure.

DETAILED DESCRIPTION

A touch display device according to the present disclosure may receive a touch input from a user based on a touch sensor and execute a command corresponding to the touch input. The touch display device may be, but not limited to, any of a TV, a video player, a personal computer (PC), a home theater, an automotive electrical device, a smartphone, and so on.

The touch display device according to the present disclosure may be configured as a light emitting diode (LED) display device, a quantum dot display (QDD) device, or a liquid crystal display (LCD) device. For convenience of description, a light emitting display device that directly emits light based on inorganic LEDs or organic LEDs is taken as an example of the touch display device.

Further, the touch sensor may operate in a self-capacitance scheme in which a capacitance variation is detected based on one touch electrode or a mutual capacitance scheme in which a capacitance variation is detected based on two touch electrodes. For convenience, the following description starting from FIG. 1 is given in the context of the self-capacitance scheme, by way of example.

The term "unit" used herein may include any electrical circuitry, features, components, an assembly of electronic components or the like. That is, "unit" may include any processor-based or microprocessor-based system including systems using microcontrollers, integrated circuit, chip, microchip, reduced instruction set computers (RISC), application specific integrated circuits (ASICs), field-programmable gate arrays (FPGAs), graphical processing units (GPUs), logic circuits, and any other circuit or processor capable of executing the various operations and functions described herein. The above examples are examples only, and are thus not intended to limit in any way the definition or meaning of the term "unit." In some embodiments, the various units described herein may be included in or otherwise implemented by processing circuitry such as a microprocessor, microcontroller, or the like.

Figure 1:
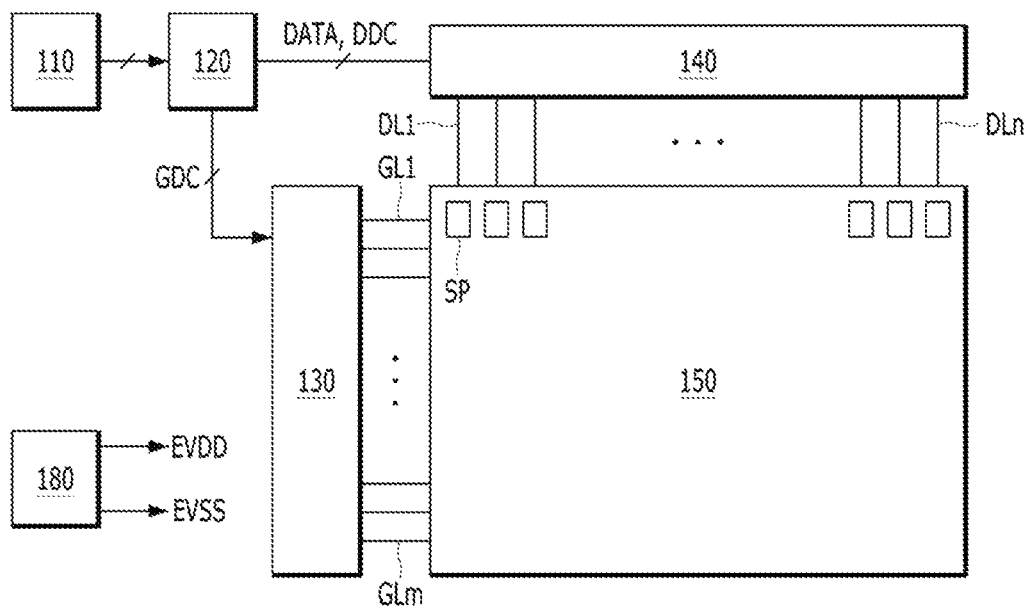
FIG. 1 is a block diagram illustrating a light emitting display device according to the present disclosure.
Figure 2:
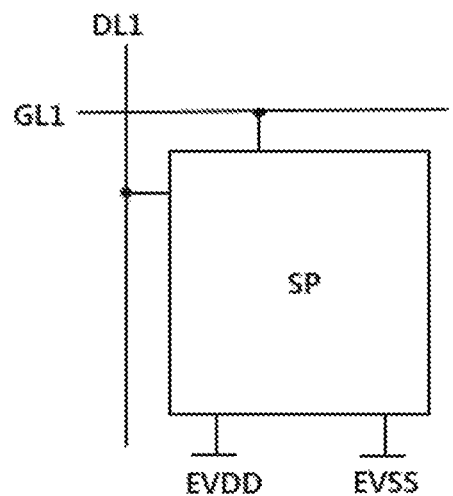
FIG. 2 is a diagram illustrating the configuration of a sub-pixel illustrated in FIG. 1.

FIG. 1 is a block diagram illustrating a light emitting display device, and FIG. 2 is a diagram illustrating the configuration of a sub-pixel illustrated in FIG. 1.

Referring to FIGS. 1 and 2, the light emitting display device may include an image supply 110, a timing controller 120, a scan driver 130, a data driver 140, a display panel 150, and a power supply 180.

The image supply (or host system) 110 may output various driving signals together with an image data signal received from the outside or an image data signal stored in an internal memory. The image supply 110 may transmit the data signal and the various driving signals to the timing controller 120.

The timing controller 120 may output a gate timing control signal GDC for controlling the operation timing of the scan driver 130, a data timing control signal DDC for controlling the operation timing of the data driver 140, and various synchronization signals (e.g., a vertical synchronization signal Vsync and a horizontal synchronization signal Hsync). The timing controller 120 may transmit a data signal DATA received from the image supply 110 together with the data timing control signal DDC to the data driver 140. The timing controller 120 may be configured in the form of an integrated circuit (IC) and mounted on a printed circuit board (PCB), which should not be construed as limiting the present disclosure.

The scan driver 130 may output a scan signal (or a scan voltage) in response to the gate timing control signal GDC received from the timing controller 120. The scan driver 130 may transmit the scan signal to sub-pixels included in the display panel 150 through scan lines GL1 to GLm. The scan driver 130 may be configured in the form of an IC or may be formed directly on the display panel 150 in a gate-in-panel (GIP) manner, which should not be construed as limiting the present disclosure.

The data driver 140 may sample and latch the data signal DATA in response to the data timing control signal DDC received from the timing controller 120, and convert a digital data signal to an analog data voltage based on a gamma reference voltage. The data driver 140 may supply the data voltage to the sub-pixels included in the display panel 150 through data lines DL1 to DLn. The data driver 140 may be configured in the form of an IC and mounted on the display panel 150 or may be mounted on the PCB, which should not be construed as limiting the present disclosure.

The power supply 180 may generate high-potential first power and low-potential second power based on an external input voltage received from the outside and output the high-potential first power and the low-potential second power through a first power line EVDD and a second power line EVSS, respectively. The power supply 180 may generate and output a voltage (e.g., a gate voltage including a gate high voltage and a gate low voltage) for driving the scan driver 130 or a voltage (e.g., a drain voltage including a drain voltage and a half drain voltage) for driving the data driver 140.

The display panel 150 may display an image in response to a driving signal including the scan signal and the data voltage, the first power, and the second power. The sub-pixels of the display panel 150 directly emit light. The display panel 150 may be manufactured based on a rigid or flexible substrate formed of a material such as glass, silicon, or polyimide. In addition, the sub-pixels that emit light may be red, green, and blue (RGB) sub-pixels or red, green, blue, and white (RGBW) sub-pixels, which form pixels.

For example, as shown in FIG. 2, one sub-pixel SP may be connected to the first gate line GL1, the first data line DL1, the first power line EVDD, and the second power line EVSS. The sub-pixel SP may include a pixel circuit with a switching transistor, a driving transistor, a capacitor, and an organic light emitting diode. The sub-pixels SP used in the light emitting display device, which directly emit light, have a complex circuit configuration. Furthermore, there are various compensation circuits for compensating for deterioration of not only the organic light emitting diode that emits light but also the driving transistor that applies a driving current to the organic light emitting diode. In this context, a sub-pixel SP is illustrated as simplified in the form of a block.

The timing controller 120, the scan driver 130, and the data driver 140 have been described above as separate components. However, one or more of the timing controller 120, the scan driver 130, and the data driver 140 may be integrated into one IC depending on implementation of the light emitting display device.

FIGS. 3 to 6 are block diagrams illustrating a touch display device.

Figure 3:
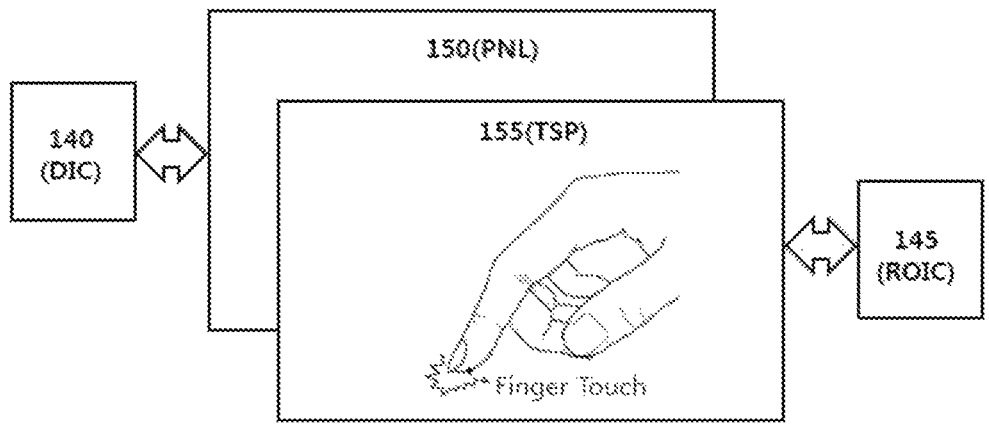
FIGS. 3 to 6 are block diagrams illustrating a touch display device.
Figure 4:
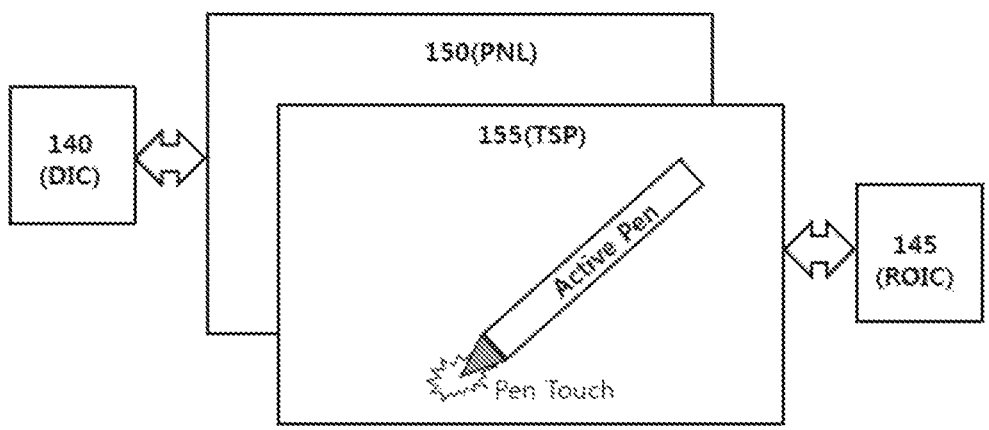

Referring to FIGS. 3 and 4, the touch display device may include a display panel 150 (or a display panel PNL), a touch sensor 155 (or a touch sensor TSP), a data driver 140 (or a data driver DIC), and a touch driver 145 (or a touch driver ROIC) (e.g., a read-out circuit or a sensing circuit).

The touch sensor 155, which is an input device for receiving a touch input from a user, may be positioned together with the display panel 150 for displaying an image.

The touch sensor 155 may have a touch electrode. The touch sensor 155 may be implemented as a separate touch sensor, implemented together with a part of the display panel 150, or implemented inside (integrated with) the display panel 150, depending on how the touch electrode and a peripheral structure are manufactured.

The touch driver 145 may detect the presence or absence of a touch on the display panel 150 and information about the position of the input based on a process of applying a touch driving voltage through the touch electrode included in the touch sensor 155 and performing sensing. The touch driver 145 may operate together with the touch sensor 155 and sense a finger touch or a pen touch of the user.

Figure 5:
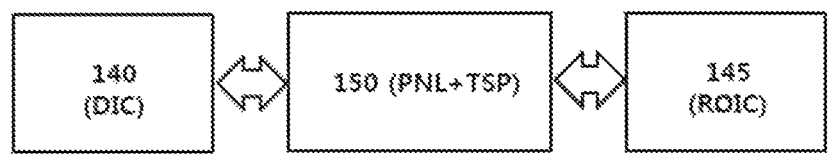
Figure 6:
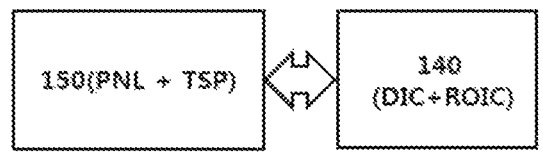

Referring to FIGS. 5 and 6, the touch driver 145 may be implemented in various manners according to how the display panel 150 and the touch sensor 155 are implemented. For example, the touch driver 145 may be configured in the form of an integrated circuit (IC) separated from the data driver 140 or may be incorporated into the data driver 140.

Figure 7:
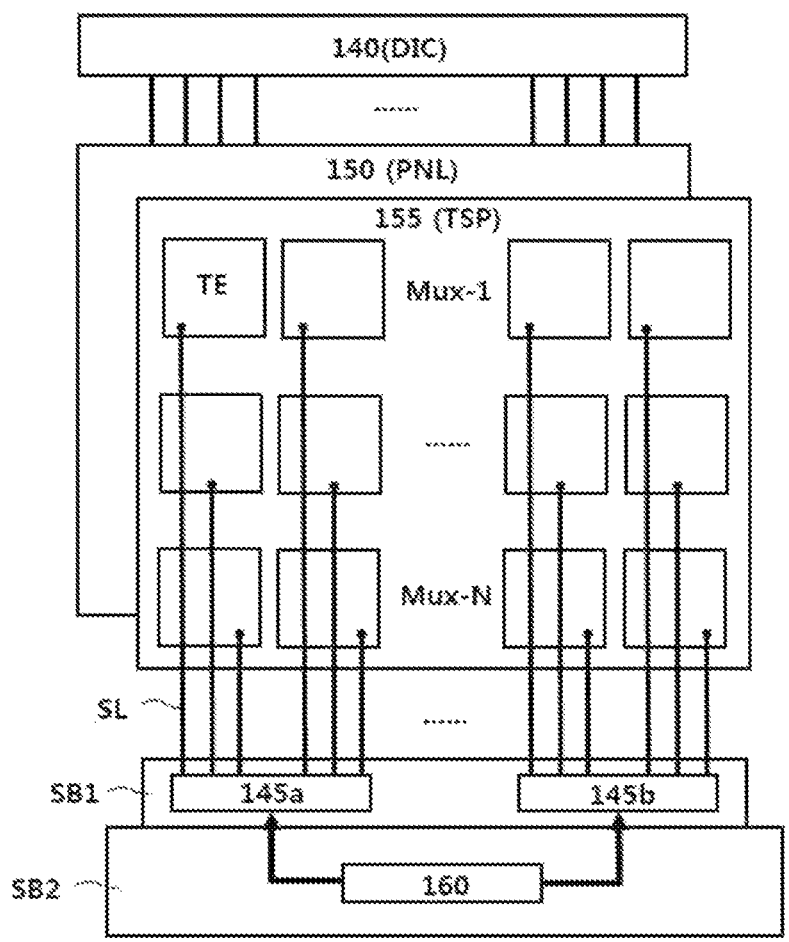
FIG. 7 is a block diagram illustrating a touch display device according to an embodiment of the present disclosure.
Figure 8:
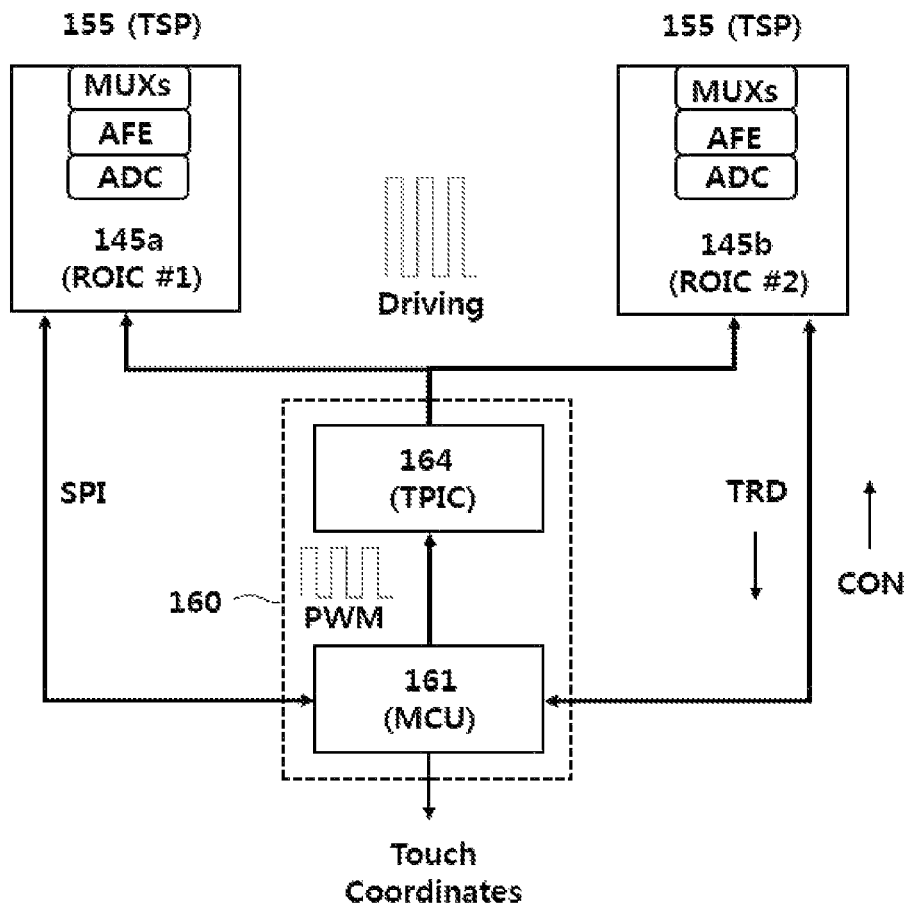
FIG. 8 is a block diagram illustrating an apparatus for driving a touch sensor illustrated in FIG. 7.
Figure 9:
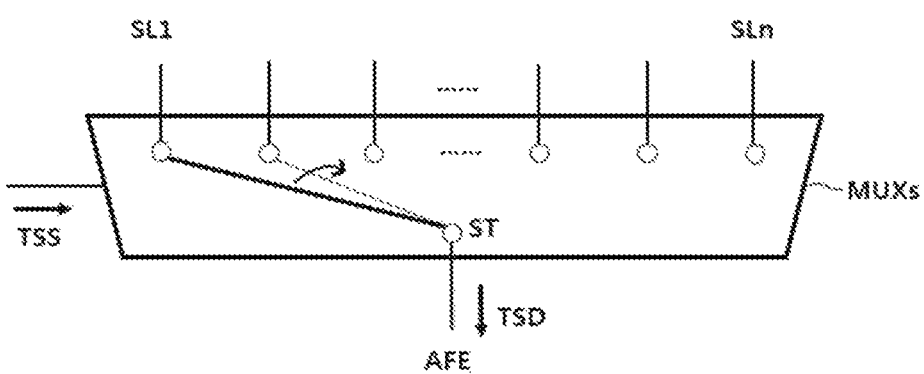
FIGS. 9 and 10 are diagrams illustrating a time division circuit unit and an analog circuit unit illustrated in FIG. 8.
Figure 10:
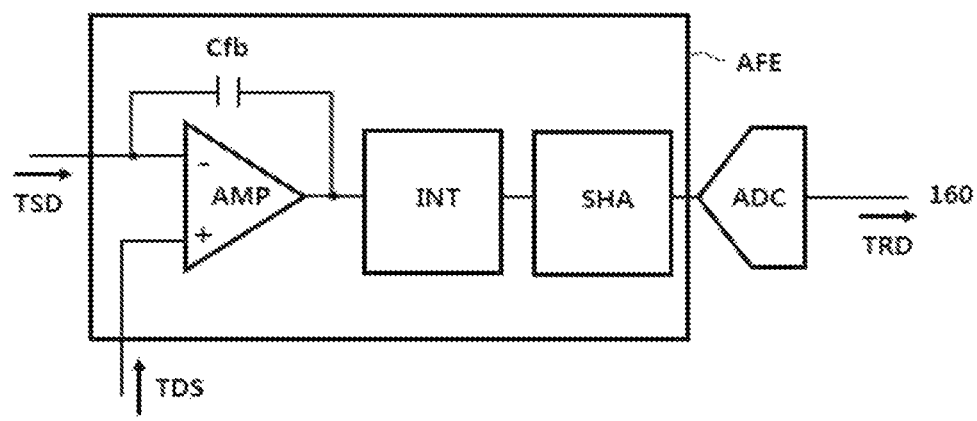
Figure 11:
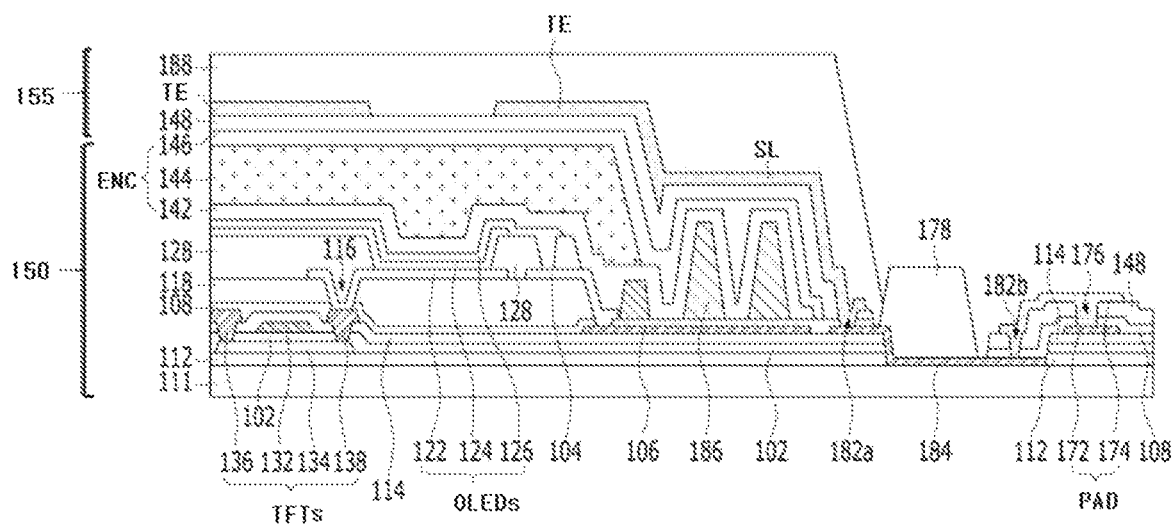
FIG. 11 is a diagram illustrating a cross-section of a display panel having the touch sensor.

FIG. 7 is a block diagram illustrating a touch display device according to an embodiment of the present disclosure, FIG. 8 is a block diagram illustrating an apparatus for driving a touch sensor illustrated in FIG. 7, FIGS. 9 and 10 are diagrams illustrating a time division circuit unit and an analog circuit unit illustrated in FIG. 8, and FIG. 11 is a diagram illustrating a cross-section of a display panel having the touch sensor.

Referring to FIG. 7, the touch sensor 155 may include a plurality of touch electrodes TE, and may be located on the display panel 150. The touch electrodes TE may be electrically connected to touch drivers 145*a* and 145*b* through touch sensing lines SL. One or more touch drivers 145*a* and 145*b* may be disposed according to the size of the touch sensor 155. The following description is given with the appreciation that first and second touch drivers 145*a* and 145*b* are disposed, by way of example.

The first and second touch drivers 145*a* and 145*b* may drive and sense the touch electrodes TE arranged on a first mux (multiplexer) line Mux-1 to an N-th mux line Mux-N in time division. The first and second touch drivers 145*a* and 145*b* may be controlled by a touch control unit 160. The first and second touch drivers 145*a* and 145*b* and the touch control unit 160 may be collectively referred to as a touch circuit unit. The first and second touch drivers 145*a* and 145*b* may be positioned on a first external substrate SB1, and the touch control unit 160 may be positioned on a second external substrate SB2. However, this is merely an example, and the first and second touch drivers 145*a* and 145*b* and the touch control unit 160 may be arranged on the same substrate and integrated into one IC.

Referring to FIG. 8, the touch control unit 160 may include a first touch controller MCU 161 and a second touch controller TPIC 164. The first touch controller 161 may transmit a control signal CON for touch driving via a communication interface coupled to at least one of the first touch driver 145*a* or the second touch driver 145*b*, and receive touch raw data TRD from the at least one of the first touch driver 145*a* or the second touch driver 145*b*. The first touch controller 161 may calculate and output touch coordinates based on the touch raw data TRD. While a serial peripheral interface SPI is shown as an example of the communication interface, the present disclosure is not limited thereto.

The first touch controller 161 may control the second touch controller 164 based on a pulse width signal PWM. The second touch controller 164 may control the operation timings of the first touch driver 145*a* and the second touch driver 145*b* based on the pulse width signal PWM received from the first touch controller 161. The first touch driver 145*a* and the second touch driver 145*b* may be controlled by the touch control unit 160, and may transmit and receive driving information to and from each other.

Each of the first touch driver 145*a* and the second touch driver 145*b* may include a time division circuit unit MUXs, an analog circuit unit AFE, and a digital converter ADC. The time division circuit unit MUXs may perform an operation of applying a touch driving voltage through the touch electrodes included in the touch sensor 155 and then sensing in time division. The analog circuit unit AFE may obtain a touch sensing voltage output from the time division circuit unit MUXs. The digital converter ADC may convert an analog touch sensing voltage received from the analog circuit unit AFE into a digital touch sensing voltage.

Referring to FIG. 9, the time division circuit unit MUXs may operate based on a time division control signal TSS, and connect a sensing terminal ST to one of a first touch sensing line SL1 to an N-th touch sensing line SLn, sequentially, non-sequentially, or randomly. Although FIG. 9 is physically illustrated to explain the driving characteristics of the time division circuit unit MUXs, the time division circuit unit MUXs may be implemented in the form of a logic circuit.

Referring to FIG. 10, the analog circuit unit AFE may include a preamplifier AMP, a feedback capacitor Cfb, an integrator INT, and a sample holder SHA. The analog circuit unit AFE may integrate, sample, and output variations of a charging voltage (charge) of the feedback capacitor Cfb according to the presence or absence of a touch.

The preamplifier AMP may have a non-inverting terminal "+" connected to an output line that transmits the touch driving voltage TDS, an inverting terminal "−" connected to an input line that transmits the touch sensing voltage TSD, and an output terminal connected to an input terminal of the integrator INT. The feedback capacitor Cfb may have one end connected to the inverting terminal—of the preamplifier AMP and the other end connected to the output terminal of the preamplifier AMP.

The integrator INT may have an input terminal connected to the output terminal of the preamplifier AMP, and an output terminal connected to an input terminal of the sample holder SHA. The integrator INT may transmit an integral value to the sample holder SHA. The sample holder SHA may sample the integral value, transmit a previously sampled integral value to the digital converter ADC, and at the same time, hold a currently sampled integral value for a predetermined time (or in some embodiments, a selected time).

The digital converter ADC may convert an integrated analog touch sensing voltage value from the sample holder SHA into a digital touch sensing voltage. The touch sensing voltage value output from the digital converter ADC may be data based on which the presence or absence of a touch or touch position information is determined. This data may be referred to as touch raw data TRD. The touch raw data TRD output from the digital converter ADC may be transmitted to the touch control unit 160 to determine whether there is a touch.

Referring to FIG. 11, the display panel 150 may include transistor layer TFTs that forms thin-film transistors and a light emitting diode layer OLEDs that forms organic light emitting diodes. The touch sensor 155 may include a touch electrode TE. The touch sensor 155 may be implemented as an in-cell or on-cell type formed in a series of processes for manufacturing the display panel 150 as well as an add-on type separately attached onto the display panel 150. An example of the on-cell type will be described below.

A multi-buffer layer 112 may be disposed on a substrate 111. The transistor layer TFTs may be disposed on the multi-buffer layer 112. The transistor layer TFTs may include a semiconductor layer 134, a gate insulating layer 102, a gate electrode 132, an interlayer insulating layer 114, and source and drain electrodes 136 and 138 contacting the semiconductor layer 134, which are stacked on the multi-buffer layer 112. The illustrated transistor layer TFTs are driving transistors that supply a driving current to the organic light emitting diodes. A protection layer 108, a planarization layer 118, and a bank 128 may be stacked on the transistor layer TFTs.

The light emitting diode layer OLEDs may be partly disposed on the bank 128. The light emitting diode layer OLEDs may include a lower electrode 122 electrically connected to the drain electrode 138 of the transistor layer TFTs through a contact hole 116, a light emitting layer 124, and an upper electrode 126. The upper electrode 126 may be connected to the second power line that transmits second power through a jumping electrode 104 on the planarization layer and a interlayer electrode 106 on the interlayer insulating layer 114. The lower electrode 122 may be selected as an anode electrode, and the upper electrode 126 may be selected as a cathode electrode, which should not be construed as limiting the present disclosure. The light emitting layer 124 may emit, but not limited to, red, green, blue, or white light.

The transistor layer TFTs and the light emitting diode layer OLEDs may be protected by an encapsulation layer ENC. The encapsulation layer ENC may include a first inorganic layer 142, an organic layer 144, and a second inorganic layer 146. The second inorganic layer 146 may cover up to an area including a first partition wall 186 positioned at an edge of the substrate 111. However, the encapsulation layer ENC may be formed as a single layer, and may vary depending on the shapes of the structures on the substrate 111, which should not be construed as limiting.

The touch electrode TE and the touch sensing line SL may be disposed between a touch buffer layer 148 and a touch protection layer 188 on the encapsulation layer ENC. The touch sensing line SL may serve to electrically connect the touch electrode TE and a touch pad PAD. The touch protection layer 188 may partially cover a second partitioning wall 178 (crack preventing wall) positioned outside the first partitioning wall 186, which should not be construed as limiting the present disclosure.

The touch pad PAD may be positioned outside the second partitioning wall 178 or at an edge of the substrate 111. The touch pad PAD may include a lower touch electrode 172 and an upper touch electrode 174 stacked on the multi-buffer layer 112. The lower touch electrode 172 may be formed of the same material as the drain electrode 138 and positioned on the interlayer insulating layer 114. The upper touch electrode 174 may be formed of the same material as the touch electrode TE and positioned on the touch buffer layer 148. The upper touch electrode 174 may be electrically connected to the lower touch electrode 172 exposed through a touch pad contact hole 176 penetrating the protection layer 108 and the touch buffer layer 148. In addition, the touch pad PAD may be electrically connected to the touch sensing line SL through a touch connection electrode 184 positioned between the substrate 111 and the second partitioning wall 178. The touch connection electrode 184 may be connected to the touch sensing line SL through a first-side contact hole 182$a$ and to the upper touch electrode 174 through a second-side contact hole 182$b$.

The touch sensor 155 may be formed in the form of a thin film or may be implemented in the form of a panel together with the display panel 150. When the touch display device is implemented for a television or commercial field, the touch sensor 155 may have a size of about 1:1 corresponding to the size of the display panel 150. In addition, even when the touch sensor 155 grows in size to correspond to the size of the display panel 150, an input may be received through an active pen. In this case, an implementation method (driving method) is beneficial in consideration of an increase in the load of the display panel 150 and the touch sensor 155 and the resulting decrease in sensing sensitivity.

FIGS. 12 to 15 are diagrams referred to for describing considerations to be taken into account, when a large-sized touch display device is implemented.

Figure 12:
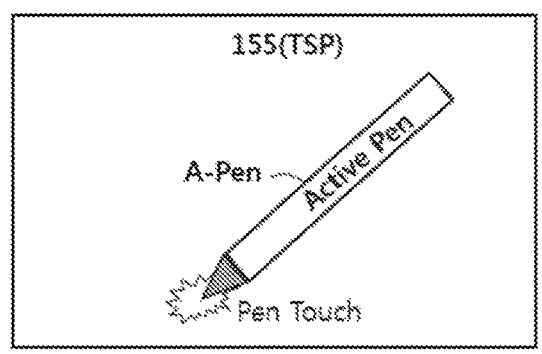
FIGS. 12 to 15 are diagrams referred to for describing considerations to be taken into account in implementing a large-sized touch display device.

Referring to FIG. 12, the touch display device may sense the presence or absence of a touch made by an active pen A-Pen placed on the touch sensor TSP 155. Further, the touch display device may sense a pressure applied onto the touch sensor 155 by the active pen A-Pen or a hovering state in which the active pen A-Pen hovers over the touch sensor 155 by a predetermined distance (or in some embodiments, a selected distance).

Figure 13:
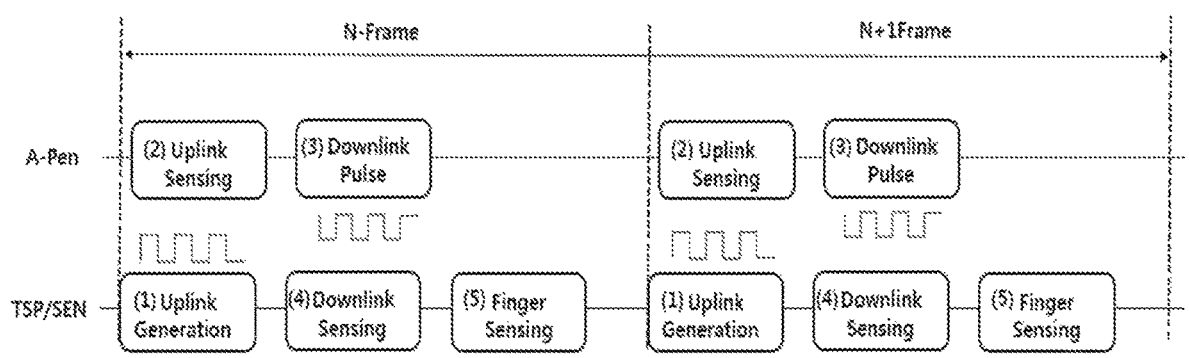

The touch display device may transmit and receive signals between the touch sensor 155 and the active pen A-Pen to sense various types of inputs made by the active pen A-Pen. An example of the signal transmission and reception is illustrated in FIG. 13.

First, the touch sensor TSP 155 (or a sensing circuit SEN) may generate an uplink signal to be transmitted to the active pen A-Pen, as denoted by "(1) Uplink Generation." Then, the active pen A-Pen may sense the uplink signal generated from the touch sensor TSP 155, as denoted by "(2) Uplink Sensing." The active pen A-Pen may generate a downlink pulse to be transmitted to the touch sensor TSP155, as denoted by "(3) Downlink Pulse." The touch sensor TSP 155 may sense the downlink pulse generated from the active pen A-Pen, as denoted by "(4) Downlink Sensing."

After signals are exchanged between the touch sensor TSP 155 and the active pen A-Pen in the above flow, a process of sensing the presence or absence of a finger touch may be performed as denoted by "(5) Finger Sensing," which should not be construed as limiting.

"(1) Uplink Generation" to "(5) Finger Sensing" may be performed during the duration of one frame (e.g., Nth Frame). During the duration of the next frame (e.g., (N+1)th Frame), the process of sensing the presence or absence of a touch made by the active pen A-Pen and a finger may be performed in the same flow.

Figure 14:
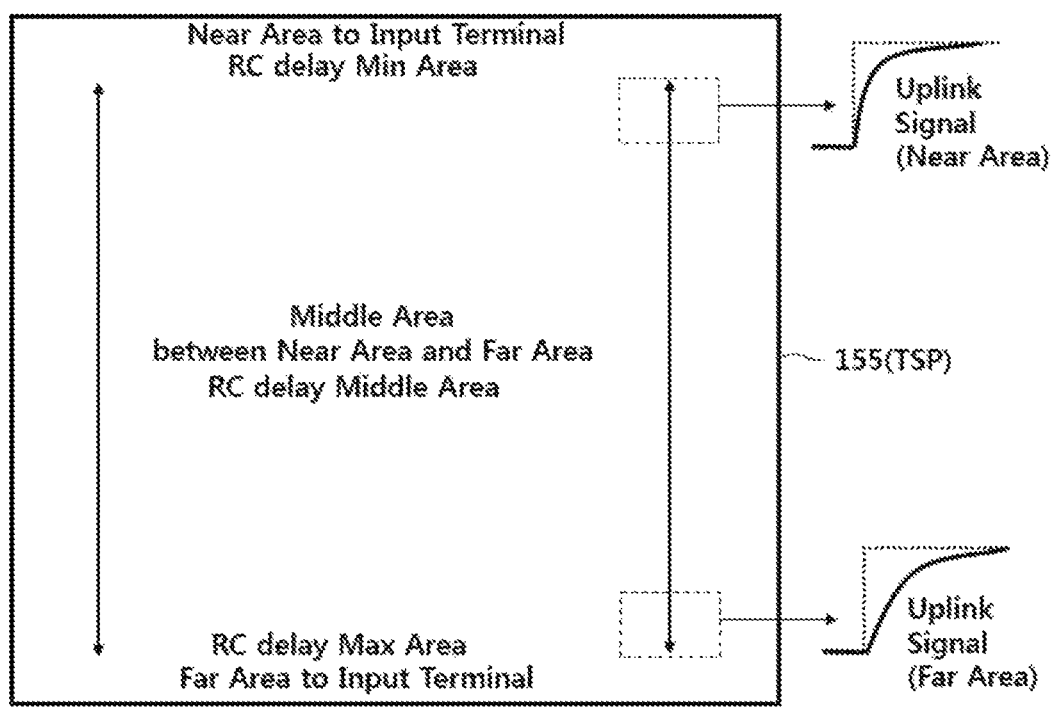
Figure 15:
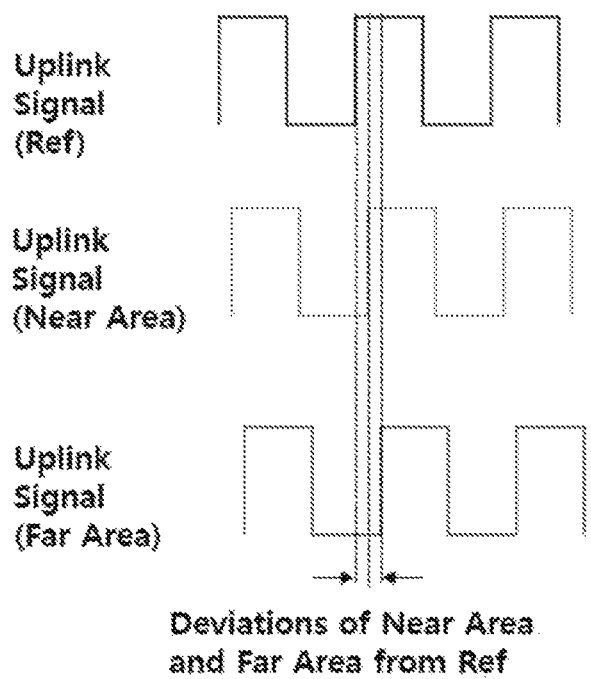

Referring to FIGS. 14 and 15, the large-sized touch display device may be placed in a high load state because the size of the touch sensor 155 is larger than that of a small-sized or medium-sized touch display device. When the touch sensor 155 is placed in the high load state, a resistance-capacitance (RC) delay occurring in an area far from the input terminal rather than in an area near to the input terminal may become serious (for example, signal reduction may be increased).

An area nearest to the input terminal, Near Area may correspond to an area with a shortest RC delay (also referred to as "RC delay Min Area"), and an area farthest from the input terminal, Far Area may correspond to an area with a longest RC delay (also referred to as "RC delay Max Area"). A middle area Middle Area located between the nearest area Near Area and the farthest area Far Area may correspond to an area with an intermediate RC delay (also referred to as "RC delay Middle Area").

The existence of a deviation between the shortest-RC delay area (e.g., RC delay Min Area) and the longest-RC delay area (e.g., RC delay Max Area) may be identified from detection of an uplink signal to be transmitted to the active pen A-Pen in the shortest-RC delay area, RC delay Min Area (Uplink Signal (Near Area)), and detection of an uplink signal to be transmitted to the active pen A-Pen in the longest-RC delay area, RC delay Max Area (Uplink Signal (Far Area)). Further, it may be noted that a signal to be transmitted to the active pen A-Pen may have an RC delay even in the shortest-RC delay area, RC delay Min Area, with respect to an uplink signal detected through the input terminal (Uplink Signal(Ref)). The shortest-RC delay area, the intermediate-RC delay area, and the longest-RC delay area may be defined based on experimental values or measurement values.

Accordingly, the present disclosure proposes the following implementation method (driving method) in consideration of the above description.

Figure 16:
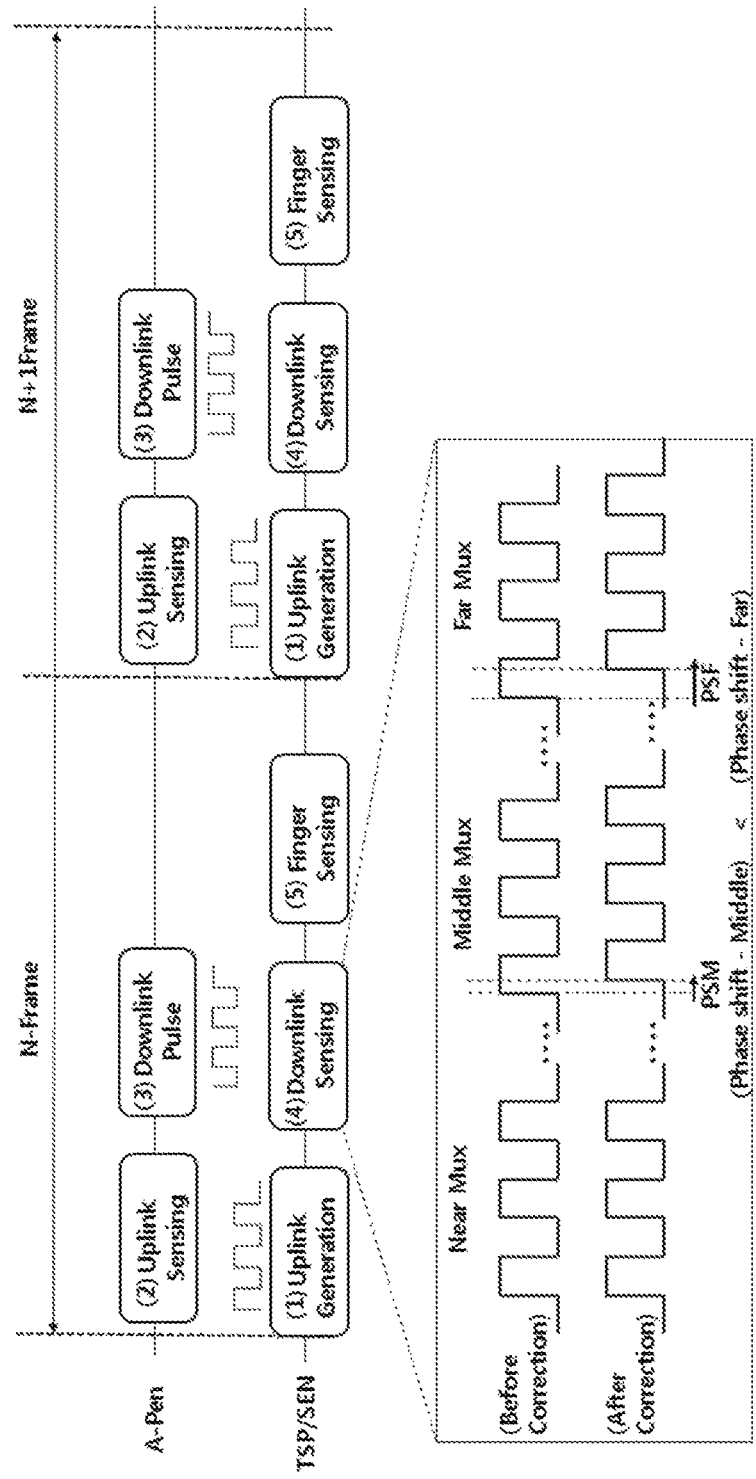
FIG. 16 is a waveform diagram referred to for describing a signal implementation method in a touch display device according to an embodiment of the present disclosure.
Figure 17:
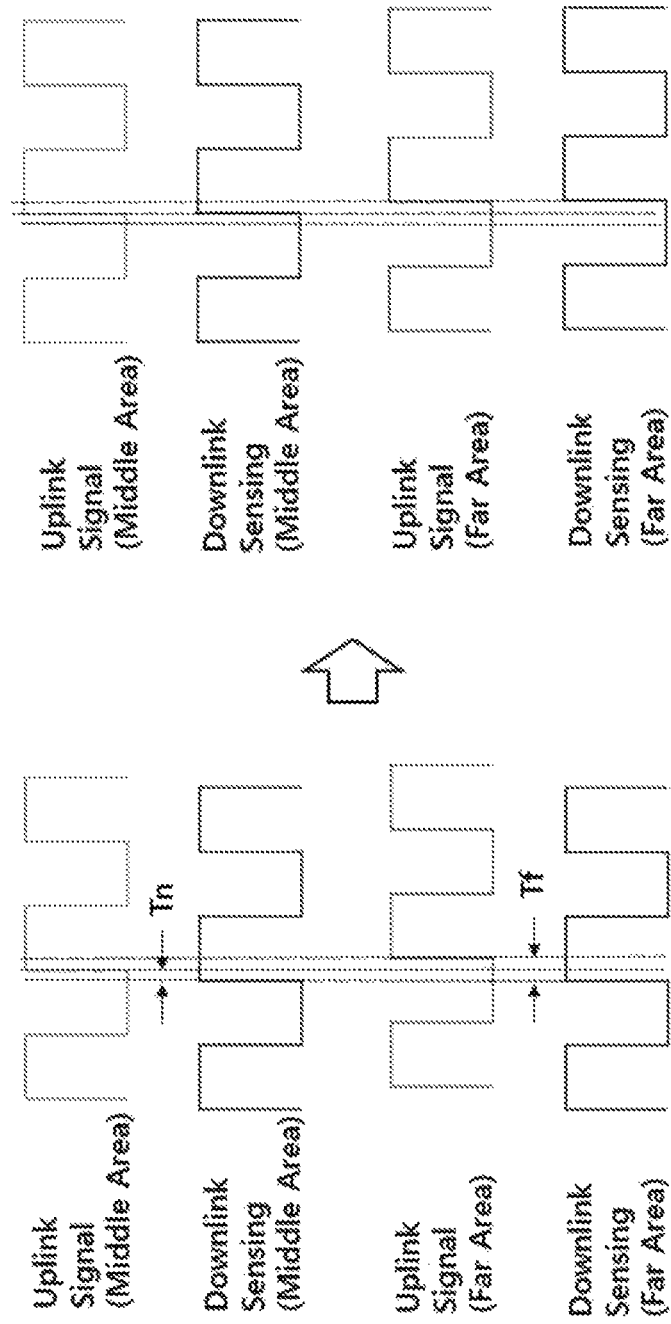
FIGS. 17A and 17B are waveform diagrams referred to for describing a change brought about by the signal implementation method illustrated in FIG. 16.
Figure 18:
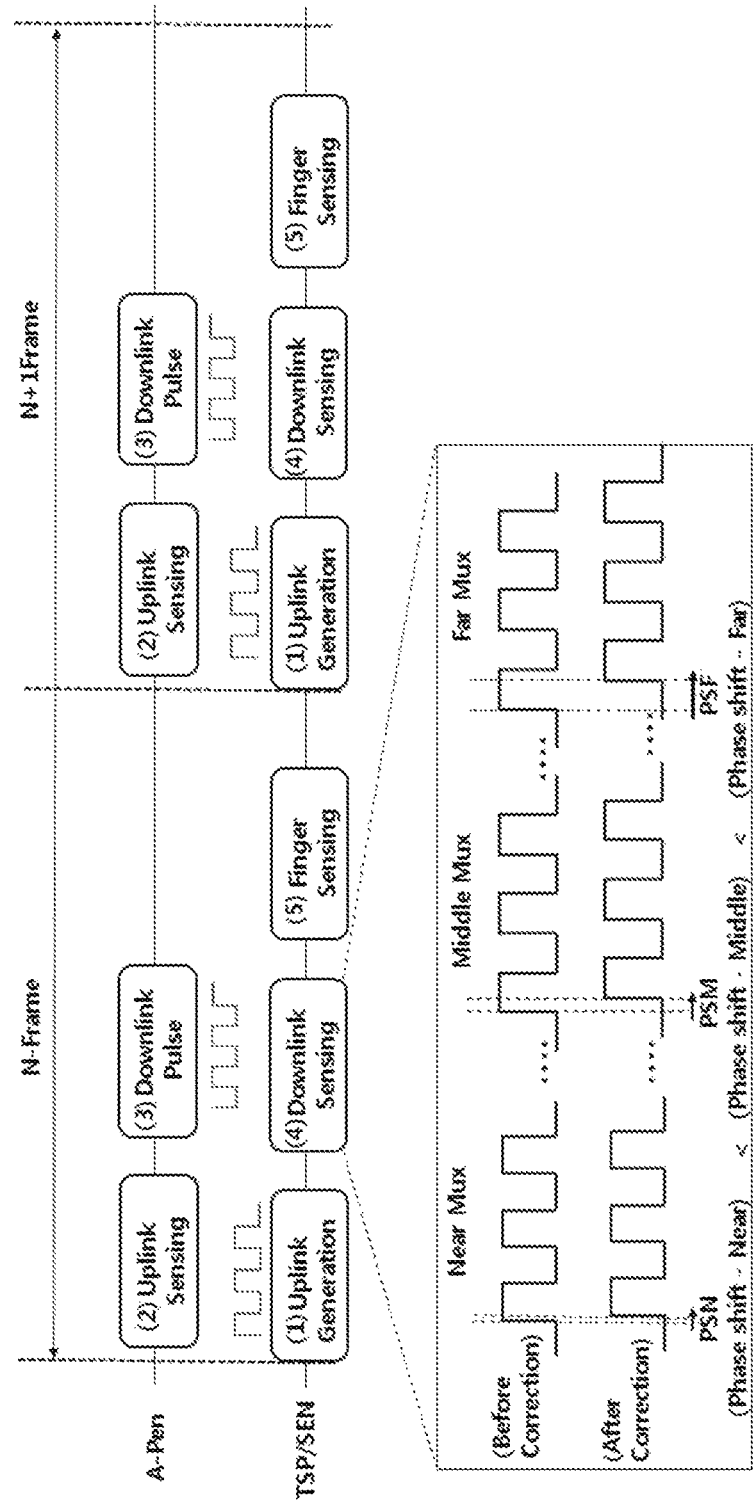
FIG. 18 is a waveform diagram referred to for describing a signal implementation method in a touch display device according to another embodiment of the present disclosure.

FIG. 16 is a waveform diagram referred to for describing a signal implementation method in a touch display device according to an embodiment of the present disclosure, FIGS. 17A and 17B are waveform diagrams referred to for describing a change brought about by the signal implementation method illustrated in FIG. 16, and FIG. 18 is a waveform diagram referred to for describing a signal implementation method in a touch display device according to another embodiment of the present disclosure.

Referring to FIG. 16, a timing of sensing a pulse generated from the active pen A-Pen may be corrected in consideration of an RC delay (a delay caused by the difference between time constants), when a large-sized touch display device is implemented according to an embodiment of the present disclosure. The timing of sensing a pulse generated by the active pen A-Pen may be performed by the touch sensor TSP (or the sensing circuit SEN). Therefore, when it is said that the timing of sensing a pulse generated from the active pen A-Pen is corrected in consideration of the RC delay, this implies correction of the timing of sensing a downlink sensing signal for sensing the pulse, as denoted by "(4) Downlink Sensing."

A first active pen sensing signal Middle Mux may be a downlink sensing signal for sensing a pulse generated from the active pen A-Pen in the intermediate-RC delay area (e.g., RC delay Middle Area) in FIG. 14. In addition, a second active pen sensing signal Far Mux may be a downlink sensing signal for sensing a pulse generated from the active pen A-Pen in the longest-RC delay area (e.g., RC delay Max Area) in FIG. 14.

In the embodiment of the present disclosure, since signals are exchanged based on the time division circuit unit MUXs as described before with reference to FIGS. 7 to 10, the term "Mux" is used in this context. Accordingly, the first active pen sensing signal Middle Mux may be described as a selection signal for sensing a pulse generated from the active pen A-Pen in the intermediate-RC delay area, RC delay Middle Area, and the second active pen sensing signal Far Mux as a selection signal for sensing a pulse generated from the active pen A-Pen in the longest-RC delay area, RC delay Max Area.

As noted from a comparison between signals before and after correction, pulses generated from the active pen A-Pen may be sensed with a gradually increasing time delay from the first active pen sensing signal Middle Mux to the second active pen sensing signal Far Mux according to some embodiments of the present disclosure.

To sense pulses generated from the active pen A-Pen with a gradually increasing time delay from the first active pen sensing signal Middle Mux to the second active pen sensing signal Far Mux, a phase shift scheme may be used to shift the phase of a signal.

When the phases of the first active pen sensing signal Middle Mux and the second active pen sensing signal Far Mux are delayed based on the phase shift scheme, the phase delay values may be placed in the relationship that "Middle<Far."

In other words, the phase of the first active pen sensing signal Middle Mux may be delayed based on a first phase delay value PSM, and the phase of the second active pen sensing signal Far Mux may be delayed based on a second phase delay value PSF. The second phase delay value PSF may be larger than the first phase delay value PSM. That is, the phase delay value gradually increases toward the longest-RC delay area, RC delay Max Area.

In the example of FIG. 17A, the RC delays of the middle area, Middle Area and the farthest area, Far Area with respect to the input terminal of the touch sensor may be detected based on signals related to active pen sensing (Uplink Signal and Downlink Sensing). For example, an RC delay-incurred first sensing deviation Tn may exist in the middle area, Middle Area, and an RC delay-incurred second sensing deviation Tf may exist in the farthest area, Far Area. In an embodiment, a phase delay may be set in consideration of the first sensing deviation Tn of the middle area, Middle Area and the second sensing deviation Tf of the farthest area, Far Area.

Referring to FIG. 17B, the signals related to active pen sensing (Uplink Signal and Downlink Sensing) may be synchronized to the same level or similar levels by correcting the sensing timing of the downlink sensing signal for sensing pulses generated from the active pen, based on the phase delay value which has been set. Accordingly, in some embodiments, the phase of the downlink sensing signal for sensing pulses generated from the active pen may be different at each position on the touch sensor (at the position of each touch electrode). As illustrated in FIG. 17B, the synchronization of the signals related to sensing of the active pen (Uplink Signal and Downlink Sensing) to the same level or similar levels may increase the sensing sensitivity of the active pen.

Referring to FIG. 18, in another embodiment of the present disclosure, pulses generated from the active pen A-Pen may be sensed with a larger delay in the order of a third active pen sensing signal Near Mux, a first active pen sensing signal Middle Mux, and a second active pen sensing signal Far Mux. The phase shift scheme may be used, in which the phase of a signal is shifted by delaying a pulse generated from the active pen A-Pen and then sensing the delayed pulse.

When the phases of the third active pen sensing signal Near Mux, the first active pen sensing signal Middle Mux, and the second active pen sensing signal Far Mux are gradually delayed based on the phase shift scheme, the phase delays of the signals may be placed in the relationship of "Near<Middle<Far."

In other words, the phase of the first active pen sensing signal Middle Mux may be delayed based on the first phase delay value PSM, the phase of the second active pen sensing signal Far Mux may be delayed based on the second phase delay value PSF, and the phase of the third active pen sensing signal Near Mux may be delayed based on a third phase delay value PSN. Further, the first phase delay value PSM may be larger than the third phase delay value PSN, and the second phase delay value PSF may be larger than the first phase delay value PSM.

Figure 19:
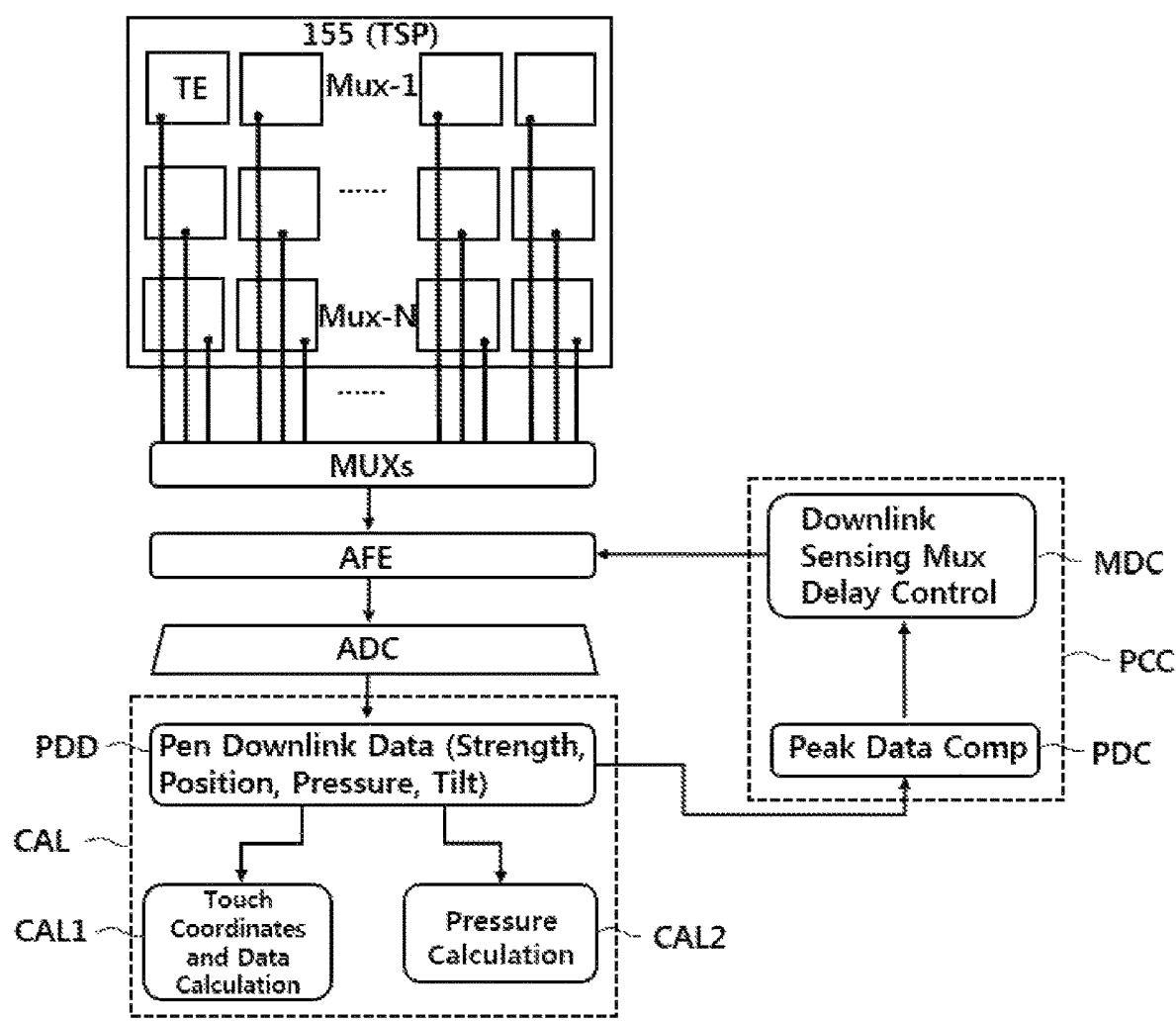
FIG. 19 is an diagram illustrating implementation of a touch display device according to an embodiment of the present disclosure.
Figure 22:
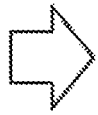

FIG. 19 is a diagram illustrating implementation of a touch display device according to an embodiment of the present disclosure, and FIGS. 20, 21, and 22 are diagrams referred to for describing considerations for implementation of a touch display device according to an embodiment of the present disclosure; and Referring to FIG. 19, the touch display device according to the embodiment may include a pen signal correction circuit PCC (which may be referred to as "a pen signal correction unit PCC") as a component for synchronizing the signals related to active pen sensing to the same level or similar levels. The pen signal correction unit PCC may derive a phase delay value for each position based on a lookup table (LUT) to synchronize the signals related to active pen sensing to the same level or similar levels.

The pen signal correction unit PCC may include a first pen signal corrector MDC and a second pen signal corrector PDC. The first pen signal corrector MDC may control the delay of the downlink sensing signal for sensing pulses generated from the active pen in order to synchronize the signals related to active pen sensing to the same level or similar levels (Downlink Sensing Mux Delay Control).

Referring to FIG. 20, the first pen signal corrector MDC may derive a sensing delay time based on the LUT, determine a phase delay value for each position based on the LUT, and automatically adjust the delay of the downlink sensing signal.

As in the example of FIG. 20, the LUT may list data from which a delay time required (required delay) for a sensing delay may be derived based on the difference between normal data and sensing data (Normal Data—Sensing Data). The normal data may be data obtained from an area in which there is no RC delay (experimental value) or from an area in which an RC delay is minimized (from the nearest area, Near Area).

As in the example of FIG. 20, when the difference between normal data and sensing data (Normal Data—Sensing Data) is less than 10, a delay time required for a sensing delay (required delay) may be selected as 0 (no delay). On the other hand, if the difference between normal data and sensing data (Normal Data—Sensing Data) is 700 or more and less than 800, a delay time required for a sensing delay (required delay) may be selected as 2.5 (maximum delay). That is, a delay time required (required delay) for a sensing delay, 0.5 (minimum delay) may be data used in a short-RC delay area, and 2.5 may be data used in a long-RC delay area in FIG. 20.

As described above, to determine a phase delay value for each position, the first pen signal corrector MDC may use data received from the second pen signal corrector PDC. The second pen signal corrector PDC may calculate a peak data ratio of the active pen based on data obtained from the active pen. A line or point at which the active pen is located may be accurately identified by calculating the peak data ratio of the active pen.

The peak data ratio of the active pen may be derived by a comparison with normal peak data, as illustrated in FIG. 21. The normal peak data may be data obtained from an area in which there is no RC delay (experimental value) or an area in which an RC delay is minimized (from the nearest area, Near Area). In FIG. 21, when the neighboring/peak data ratio is 90%, it may mean that the active pen is located at the center of a specific line or point (e.g., corresponding to peak data). On the other hand, a neighboring/peak data ratio of 10% may mean that the active pen is almost out of the center of the specific line or point (e.g., corresponds to neighboring data).

Regarding the neighboring/peak data rate, as noted from FIG. 22, 392 is the highest of neighboring values, and thus this point may have a neighboring/peak data ratio of 100%, that is, the center area contacting the active pen. On the contrary, since 82 is the lowest of the neighboring values, this point may have a neighboring/peak data ratio of 21%, that is, a neighboring area farthest from the center contacting the active pen.

Referring to FIG. 19, data obtained from the active pen may include at least one of the strength, position, pressure, or tilt of the pen, included in pen downlink data PDD of a touch calculation circuit CAL (which may be referred to as "a touch calculation unit CAL"). Some data of the strength, position, pressure, and tilt of the pen included in the pen downlink data PDD may be transmitted to a first calculator CAL1 to calculate touch coordinates and data. In addition, some data of the strength, position, pressure, and tilt of the pen included in the pen downlink data PDD may be transmitted to a second calculator CAL2 to calculate a pressure. The pen signal correction unit PCC and the touch calculation unit CAL may be included in the touch control unit, which should not be construed as limiting.

Figure 23:
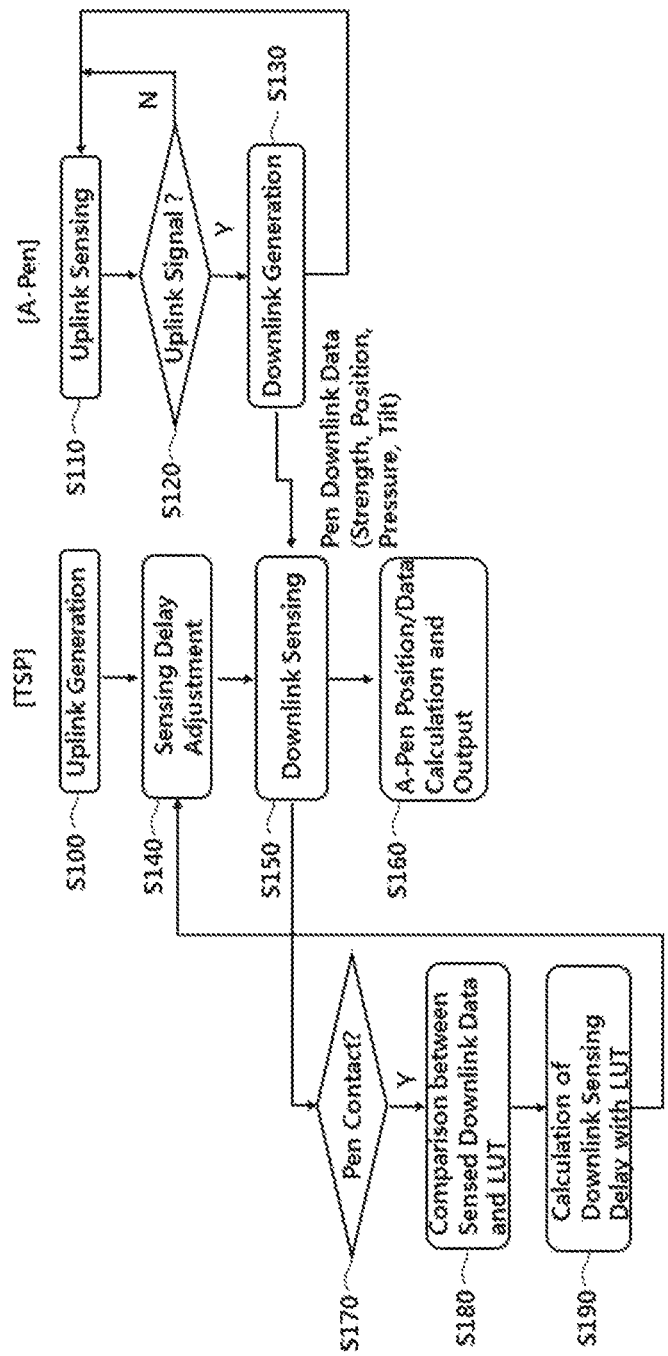
FIG. 23 is a flowchart illustrating a method of driving a touch display device according to an embodiment of the present disclosure.

FIG. 23 is a flowchart illustrating a method of driving a touch display device according to an embodiment of the present disclosure.

Referring to FIG. 23, the touch sensor TSP may generate an uplink signal to be transmitted to the active pen A-Pen (S100). The active pen A-Pen may sense the uplink signal (S110). The active pen A-Pen may determine whether the sensed signal is an uplink signal (S120).

If the sensed signal is an uplink signal (Y), the active pen A-Pen may generate a downlink pulse to be transmitted to the touch sensor TSP (S130). However, if the sensed signal is not an uplink signal (N), the procedure may return to step S110 for sensing an uplink signal. The downlink pulse may include pen downlink data such as the strength, position, pressure, and tilt of the active pen.

The touch sensor TSP may sense the downlink pulse generated from the active pen A-Pen (S150). Since the downlink pulse includes the above-described data, the downlink pulse is referred to as downlink data from the perspective of the touch sensor TSP. The touch sensor TSP may calculate the position or data of the active pen A-Pen based on the downlink data and output the calculated position or data so that the calculated position or data may be provided to an application or the like (S160).

Along with the acquisition of the downlink data from the active pen A-Pen, the touch sensor TSP may determine whether there is contact between the active pen A-Pen and the touch sensor TSP (S170). If the active pen A-Pen and the touch sensor TSP are kept in contact (Y), the downlink data obtained from the active pen (A-Pen) may be compared with an LUT (S180). The touch sensor TSP may calculate a sensing delay value for the active pen A-Pen based on the LUT (S190). A sensing delay value for each position of the active pen A-Pen may be used in step S150 for sensing a downlink pulse generated from the active pen A-Pen. If the active pen A-Pen and the touch sensor TSP are not in contact (N), the process returns to step S150 for sensing a downlink pulse generated from the active pen A-Pen.

The touch sensor TSP may adjust the sensing delay for each position of the active pen A-Pen based on the sensing delay derived in steps S180 and S190 to increase the sensing sensitivity of the active pen A-Pen (S140).

The step of adjusting a sensing delay value may or may not be performed depending on the position (RC delay characteristic) of the active pen A-Pen. For example, when there is no difference between peak data obtained when the touch sensor TSP and the active pen (A-Pen) are in contact and normal peak data stored in the LUT, the step of adjusting a sensing delay value may not be performed.

In another example, when the active pen A-Pen is positioned between the intermediate-RC delay area and the longest-RC delay area on the touch sensor TSP, the step of adjusting a sensing delay value may be performed. However, when the active pen A-Pen is positioned in or near to the shortest-RC delay area on the touch sensor TSP, the step of adjusting a sensing delay value may not be performed (may be skipped).

As is apparent from the foregoing description, the present disclosure may overcome the problem that as the cathode electrodes of the display panel are adjacent to the touch electrodes of the touch sensor and thus a parasitic capacitance increases, the sensing sensitivity of an active pen may be decreased, based on a phase shift scheme in which the phase of a sensing signal is shifted for each position of the active pen. The present disclosure may increase the sensing sensitivity (sensing ability) of the active pen by reducing or eliminating a signal deviation which may occur between the touch sensor (touch panel) and the active pen in a large-sized device, while overcoming signal reduction at each position of the active pen during downlink sensing of the active pen. Further, the problem of an increased bezel may be solved and a cost increase may be reduced or minimized, by a deviation improvement method which may substitute for a top-down division method or a separate wiring routing method.

Although the embodiments of the present disclosure have been disclosed for illustrative purposes, those skilled in the art will appreciate that various modifications, additions and substitutions are possible, without departing from the scope and spirit of the disclosure as disclosed in the accompanying claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display device comprising:
a display panel configured to display an image;
a touch sensor coupled to the display panel;
a touch circuit configured to drive and control the touch sensor; and
an input signal correction circuit coupled to the touch circuit unit, the input signal correction circuit configured to correct a sensing timing of an input placed on the touch sensor,
wherein the input includes an input from an active pen; and
wherein the input signal correction circuit changes the sensing timing according to a position of the active pen.

2. The touch display device according to claim 1, wherein the input signal correction circuit changes a timing of sensing a pulse generated from the active pen for each position of the active pen in consideration of a resistance-capacitance delay based on the position of the active pen.

3. The touch display device according to claim 1, wherein the input signal correction circuit changes a sensing timing of a downlink sensing signal for sensing a pulse generated from the active pen, based on a phase delay value different for each position of the active pen.

4. The touch display device according to claim 3, wherein the phase delay value gradually increases from an area near to an input terminal of the touch sensor toward an area far from the input terminal of the touch sensor.

5. The touch display device according to claim 1, wherein the input signal correction circuit defines a nearest area nearest to an input terminal of the touch sensor, a farthest area farthest from the input terminal of the touch sensor, and a middle area between the nearest area and the farthest area, and wherein when the active pen is located between the middle area and the farthest area, the input signal correction circuit corrects the sensing timing of the active pen based on a phase delay value which gradually increases toward the farthest area, to change a timing of sensing a pulse generated from the active pen.

6. The touch display device according to claim 1, wherein the input signal correction circuit defines a nearest area nearest to an input terminal of the touch sensor, a farthest area farthest from the input terminal of the touch sensor, and a middle area between the nearest area and the farthest area, and wherein when the active pen is located between the nearest area and the farthest area, the input signal correction circuit corrects the sensing timing of the active pen based on a phase delay value which gradually increases toward the farthest area, to change a timing of sensing a pulse generated from the active pen.

7. The touch display device according to claim 1, wherein the input signal correction circuit includes a lookup table listing data from which a delay time for the sensing timing is derived based on the difference between normal data and sensing data, and wherein the normal data is data obtained from an area with no resistance-capacitance delay or an area with a minimum resistance-capacitance delay, and the sensing data is data obtained based on driving of the active pen.

8. The touch display device according to claim 7, wherein the sensing data includes a peak data ratio of the active pen, the peak data ratio being used to identify a line or a point in which the active pen is located.

9. The touch display device according to claim 8, wherein the peak data ratio is calculated based on data obtained from the active pen.

10. A method of driving a touch display device including a display panel displaying an image, a touch sensor coupled to the display panel, and a touch circuit unit configured to drive and control the touch sensor, the method comprising:
generating an uplink signal to be transmitted to an active pen placed on the touch sensor; and
sensing a downlink pulse generated from the active pen by changing a sensing timing based on a position of the active pen.

11. The method according to claim 10, wherein the sensing of a downlink pulse comprises changing a timing of sensing the downlink pulse generated from the active pen based on a phase delay value different for each position of the active pen.

12. The method according to claim 11, wherein the phase delay value gradually increases from an area near to an input terminal of the touch sensor toward an area far from the input terminal of the touch sensor.

13. A device comprising:
a display panel;
a touch sensor coupled to the display panel, the touch sensor configured to sense input from an input device applied to the touch sensor;
a touch circuit coupled to the touch sensor, the touch circuit configured to:
generate an uplink signal to be transmitted to the input device;
receive a downlink signal generated by the input device based on the uplink signal; and
determine either a presence or an absence of the input from the input device based on the downlink signal, and
a signal correction circuit coupled to the touch circuit, the signal correction circuit configured to control a sensing timing of the downlink signals.

14. The device according to claim 13, wherein the signal correction circuit includes:
a first signal corrector configured to:
determine a position of the input within the touch sensor;
determine a phase delay value of the downlink signals generated from the input device based on the position; and
delay the downlink signals by the phase delay value.

15. The device according to claim 14, wherein the signal correction circuit includes:
a second signal corrector coupled to the first signal corrector, the second signal corrector configured to:
receive peak data value of the position and neighboring peak data value of an adjacent location of the position; and
determine a peak data ratio based on a ratio of the peak data value and the neighboring peak data value.

16. The device according to claim 14, wherein the phase delay value is based on a resistance-capacitance delay based on the position of the input device within the touch sensor.

17. The device according to claim 15, wherein the signal correction circuit retrieves data from a lookup table which include a delay time for sensing timing of the downlink signals, the look up table being based on a difference between normal data and sensing data, and
wherein the normal data is data obtained from an area with no resistance-capacitance delay or an area with a minimum resistance-capacitance delay, and the sensing data is based on the peak data ratio indicative of the position of the input device.

18. The device according to claim 17, wherein the input signal correction circuit defines a first area near a first side of the touch sensor, a second area farthest from the first side of the touch sensor, and a third area between the first area and the second area,
wherein when the input device is located between the third area and the second area, the signal correction circuit corrects the sensing timing of the input device based on a first phase delay value which gradually increases from the third area to the second area, to change a timing of sensing the downlink signal generated from the input device,
wherein when the input device is located between the first area and the third area, the signal correction circuit corrects the sensing timing of the input device based on a second phase delay value which gradually increases from the first area to the third area, to change a timing of sensing the downlink signal generated from the input device, and
wherein the first phase delay value is greater than the second phase delay value.

* * * * *